United States Patent
Kenny et al.

(10) Patent No.: US 11,383,408 B2
(45) Date of Patent: Jul. 12, 2022

(54) MOULD ASSEMBLY FOR FORMING A SPLICED JOINT IN A HANDRAIL, OR OTHER ELONGATE ARTICLE

(71) Applicant: EHC Canada, Inc., Oshawa (CA)

(72) Inventors: Andrew Oliver Kenny, Toronto (CA); Gregg Scott Dixon, Oshawa (CA); Reginald Anthony Butwell, Young's Point (CA)

(73) Assignee: EHC Canada, Inc., Oshawa (CA)

( * ) Notice: Subject to any disclaimer, the term of this patent is extended or adjusted under 35 U.S.C. 154(b) by 131 days.

(21) Appl. No.: 16/766,396

(22) PCT Filed: Nov. 29, 2018

(86) PCT No.: PCT/CA2018/051523
§ 371 (c)(1),
(2) Date: May 22, 2020

(87) PCT Pub. No.: WO2019/104435
PCT Pub. Date: Jun. 6, 2019

(65) Prior Publication Data
US 2021/0370551 A1   Dec. 2, 2021

Related U.S. Application Data

(60) Provisional application No. 62/591,971, filed on Nov. 29, 2017.

(51) Int. Cl.
*B29C 33/04* (2006.01)
*B29C 33/30* (2006.01)
(Continued)

(52) U.S. Cl.
CPC ............ *B29C 33/04* (2013.01); *B29C 33/301* (2013.01); *B29C 33/303* (2013.01); *B29C 33/44* (2013.01);
(Continued)

(58) Field of Classification Search
CPC ..... B29C 33/04; B29C 33/301; B29C 33/303; B29C 33/44; B29C 33/76;
(Continued)

(56) References Cited

U.S. PATENT DOCUMENTS 6,086,806 A   7/2000   Weatherall et al.
6,241,153 B1  6/2001   Tiffany, III
(Continued)

FOREIGN PATENT DOCUMENTS

CA   2526529 A1   12/2004
CA   2482620 C    3/2005
(Continued)

OTHER PUBLICATIONS

Search Report and Written Opinion dated Feb. 19, 2019 in respect of PCT/CA2018/051523.
Extended European Search Report dated Jul. 16, 2021 in respect of European Application No. 18884455.9.

*Primary Examiner* — Jacob T Minskey
*Assistant Examiner* — S. Behrooz Ghorishi
(74) *Attorney, Agent, or Firm* — Bereskin & Parr LLP/S.E.N.C.R.L., s.r.l.

(57) ABSTRACT

A core mould element can be mounted between first and second mould parts. The first and second mould parts and the core mould element can be mounted between first and second thermal platens. The thermal platens can have generally planar faces for mounting in a press, for maintaining a desired pressure within the mould assembly. The thermal platens can provide for heating and cooling the mould assembly, and each can include a central portion and end portions, with thermal breaks between the central portion and the end portions. Bores can extend through the central and end portions, for receiving heating elements and pipes (Continued)

for cooling fluid. The end portions can include bores for a cooling fluid for cooling the end portions.

27 Claims, 11 Drawing Sheets

(51) Int. Cl.
| | |
|---|---|
| *B29C 33/44* | (2006.01) |
| *B29C 33/76* | (2006.01) |
| *B29C 35/04* | (2006.01) |
| *B29C 35/16* | (2006.01) |
| *B29C 65/02* | (2006.01) |
| *B29C 65/70* | (2006.01) |
| *B29C 65/78* | (2006.01) |
| *B29C 33/02* | (2006.01) |
| *B29L 31/00* | (2006.01) |
| *B66B 23/24* | (2006.01) |

(52) U.S. Cl.
CPC .............. *B29C 33/76* (2013.01); *B29C 35/04* (2013.01); *B29C 35/16* (2013.01); *B29C 65/02* (2013.01); *B29C 65/70* (2013.01); *B29C 65/7897* (2013.01); *B29C 2033/023* (2013.01); *B29C 2035/1616* (2013.01); *B29L 2031/709* (2013.01); *B66B 23/24* (2013.01)

(58) Field of Classification Search
CPC .............. B29C 2033/023; B29C 33/02; B29C 35/04; B29C 35/16; B29C 2035/1616; B29C 35/02; B29C 65/02; B29C 65/70; B29C 65/7897; B29C 70/84; B29C 37/0003; B29C 37/02; B29L 2031/709; B66B 23/24
See application file for complete search history.

(56) References Cited

U.S. PATENT DOCUMENTS

| | | | |
|---|---|---|---|
| 6,761,259 B1 | 7/2004 | Onodera et al. | |
| 6,790,401 B2 | 9/2004 | Yasuo | |
| 7,670,539 B2 | 3/2010 | Kang | |
| 8,038,818 B2 | 10/2011 | Murata et al. | |
| 9,290,360 B2 | 3/2016 | Takeyama et al. | |
| 9,579,839 B2 | 2/2017 | Kenny et al. | |
| 10,124,992 B2 | 11/2018 | Takeyama et al. | |
| 2008/0054527 A1* | 3/2008 | Kang | B29C 45/2602 |
| | | | 264/327 |
| 2017/0166420 A1 | 6/2017 | Takeyama et al. | |
| 2018/0106326 A1* | 4/2018 | van't Schip | B29C 66/3494 |

FOREIGN PATENT DOCUMENTS

| | | |
|---|---|---|
| CN | 101855059 A | 10/2010 |
| CN | 203957349 U | 11/2014 |
| CN | 203959626 U | 11/2014 |
| CN | 105415561 A | 3/2016 |
| FR | 2920508 A1 | 3/2009 |
| GN | 1218433 A | 6/1999 |
| JP | 2000351570 A | 12/2000 |
| JP | 2001328790 A | 11/2001 |
| KR | 20160111851 A | 9/2016 |
| WO | 2015182739 A1 | 12/2015 |
| WO | 2019/104434 A1 | 6/2019 |
| WO | 2019/104435 A1 | 6/2019 |

\* cited by examiner

MOULD ASSEMBLY FOR FORMING A SPLICED JOINT IN A HANDRAIL, OR OTHER ELONGATE ARTICLE

CROSS-REFERENCE TO RELATED APPLICATIONS

This is a national stage application of International Application No. PCT/CA2018/051523 filed on Nov. 29, 2018, which claims priority to U.S. Provisional Application No. 62/591,971 filed on Nov. 29, 2017, and the entire contents of each are hereby incorporated herein by reference.

FIELD

The present disclosure relates generally to a mould assembly for forming a spliced joint in a handrail or other elongate article of constant cross-section.

BACKGROUND

The following paragraphs are not an admission that anything discussed in them is prior art or part of the knowledge of persons skilled in the art.

U.S. Pat. No. 6,086,806 discloses a mould and method of forming a joint in a handrail for escalators or moving walkways. The handrail may have a generally C-shaped cross section defining an internal generally T-shaped slot. The handrail is formed by extrusion and comprises a first layer of thermoplastic material extending around the T-shaped slot. A second layer of thermoplastic material extends around the outside of the first layer and defines the exterior profile of the handrail. A slider layer lines the T-shaped slot and is bonded to the first layer. A stretch inhibitor extends within the first layer. The first layer may be formed from a harder thermoplastic than the second layer. The entire contents of U.S. Pat. No. 6,086,806 are herein incorporated by reference.

INTRODUCTION

The following paragraphs are intended to introduce the reader to the more detailed description that follows and not to define or limit the claimed subject matter.

In accordance with a first aspect of the present disclosure, there is provided a mould assembly for moulding a joint in an elongate article, the mould assembly including: a first mould part; a second mould part; a core mould element for mounting between the first and second mould parts; a first thermal platen; and a second thermal platen, wherein the first and second mould parts and the core mould element are mounted between the first and second thermal platens.

In accordance with another aspect of the present disclosure, there is provided a mould assembly for moulding a joint in an elongate article, the mould assembly including: a first mould part; a second mould part; and a core mould element for mounting between the first and second mould parts, wherein the core mould element and the first mould part are configured to maintain spacing between at least a central portion of the core mould element and the first mould part, to reduce heat transfer therebetween.

The core mould element may include a central part and end parts at either end of the central part, and wherein the first mould part includes a central piece and side pieces, with the side pieces defining a first surface for mating with the second mould part and with the central piece displaced away from the first surface.

A further aspect of the present disclosure provides a mould assembly for moulding a joint in a handrail or other elongate article, the mould assembly including: a first press platen; a first insulated pad; a first thermal platen; a first mould part; a second mould part; a core mould element for mounting between the first and second mould parts; a second thermal platen, the first and second thermal platens heating and cooling the mould parts; and a second insulated pad; a second press platen, wherein the first press platen, the first insulated pad, the first thermal platen, and the first mould part are secured together, and the second mould part, the second thermal platen, the second insulated pad and the second press platen are secured together.

In accordance with another aspect of the present disclosure, a method for moulding an assembled joint of a handrail or other elongate article using a mould assembly is provided, the method including: fitting a core element of the mould assembly into a T-shaped slot of the assembled joint; placing the core element and the fitted joint between a first mould part and a second mould part of the mould assembly; applying pressure to the first and second mould parts to close the mould assembly and increasing pressure in the mould assembly to substantially the closing pressure; applying heat to the mould assembly and the spliced joint throughout a heating phase to increase temperature in the mould assembly from an ambient temperature to a soak temperature, while maintaining the pressure in the mould assembly at substantially the closing pressure throughout the heating phase; after the heating phase, maintaining the temperature in the mould assembly at least at the soak temperature and maintaining the pressure in the mould assembly at substantially the closing pressure throughout a soaking phase; after the soaking phase, reducing the temperature in the mould assembly to the ambient temperature by removing heat from the mould assembly and the spliced joint throughout a cooling phase, while maintaining the pressure in the mould assembly at substantially the closing pressure throughout the cooling phase; removing the core element and the fitted spliced joint from the mould assembly by lowering the pressure in the mould from the closing pressure; and removing the core element from the T-shaped slot of the moulded spliced joint.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DESCRIPTION OF THE EMBODIMENTS

Figure 1:
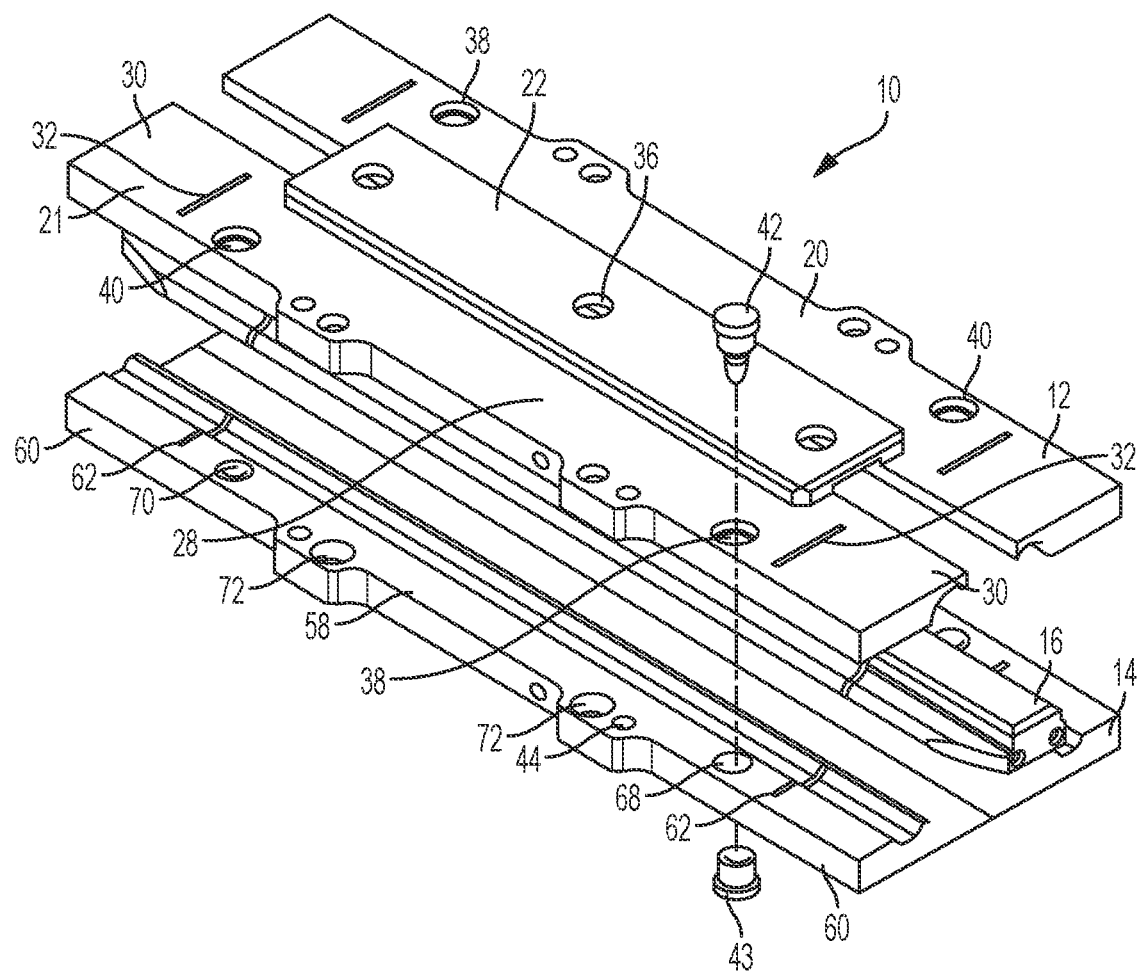
FIG. 1 is a perspective view showing elements of a mould assembly with upper and lower platens omitted, shown in an exploded configuration.

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

In the present disclosure, various elements or components may be designated as 'first' and 'second' or alternatively as 'upper' and 'lower'. In general it will be understood that the mould assembly and other components can be used in any orientation, and references to 'upper' and 'lower' are for convenience. The mould assembly may be described for moulding a handrail in an inverted position, but it will be understood that the joint in the handrail, generally can be formed with the handrail and the components of the mould in any orientation.

Additionally, while various components of the mould assembly and a handrail may be identified with descriptions that indicate an orientation, such as 'lower' and 'upper', this is only to facilitate understanding, and it is not necessary that they be used or present in that orientation. In particular, a handrail has a surface that is the top surface in normal use available to be grasped, but when moulding a spliced joint, the handrail is inverted, as detailed below. In any event, in a handrail installation, the handrail is inverted in the return run.

A mould assembly 10 is shown in FIGS. 1, 2a, 2b and 3. The mould assembly 10 includes an upper mould part 12 and a lower mould part 14. A core mould element 16 is provided between the upper and lower mould parts 12, 14.

Figure 2A:
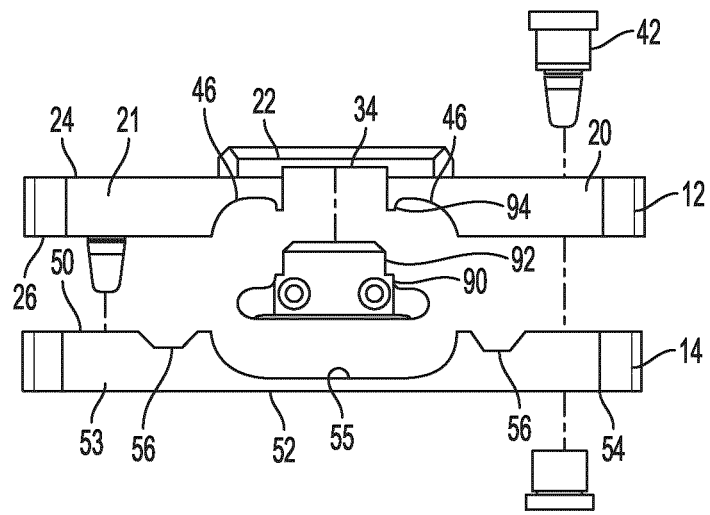
FIG. 2a is an end view of the mould assembly of FIG. 1, shown in an exploded configuration.
Figure 2B:
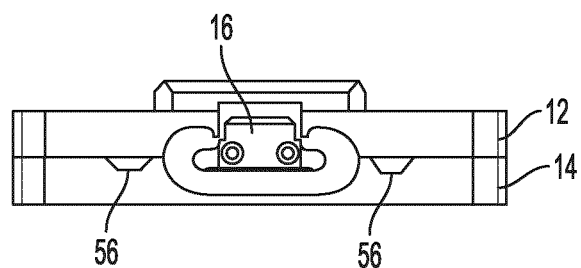
FIG. 2b is an end view of the mould assembly of FIG. 1, shown in a closed configuration.
Figure 3:
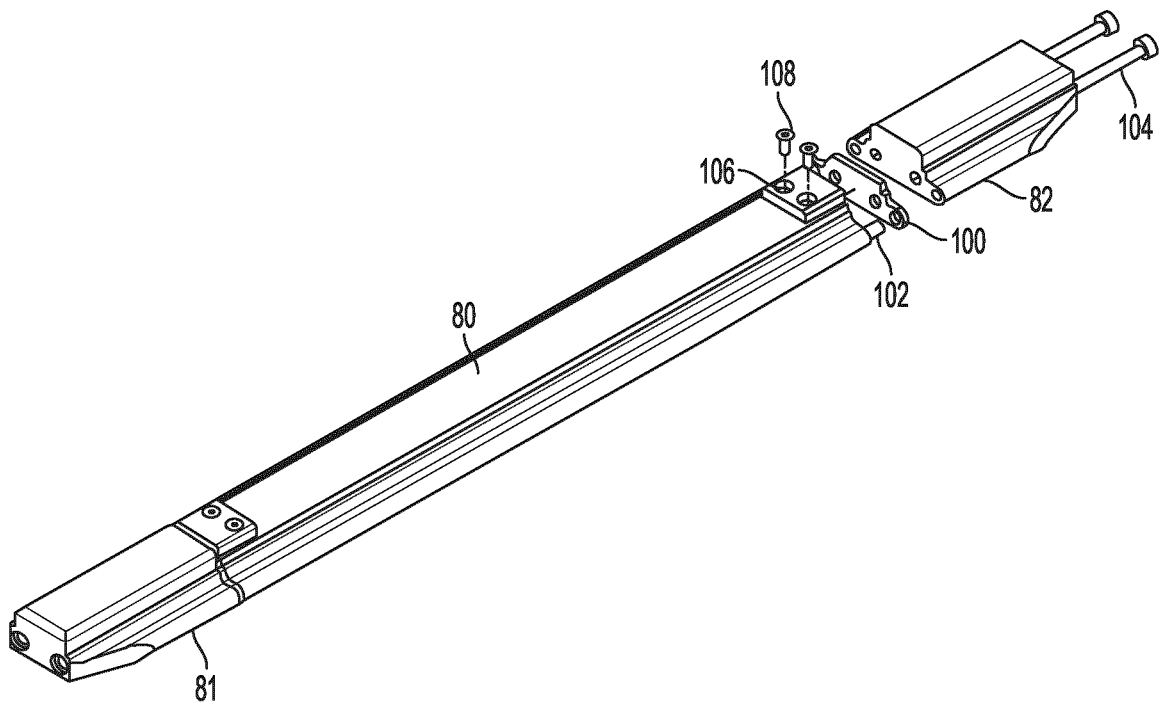
FIG. 3 is a perspective view of a core mould element.

The upper mould part 12 includes first side piece 20 and second side piece 21 that are connected together by a raised central piece 22. The side pieces 20, 21 have a common top surface 24, that is planar and parallel to a bottom surface 26 (FIG. 2a). The bottom surface 26 is intended to mate with a corresponding top surface 50 of the lower mould part 14, as detailed below.

Each of the side pieces 20, 21 has two end parts 30, separated from a central part 28 by thermal breaks 32.

The raised central piece 22 connects to the side pieces 20 and 21, and defines a rectangular channel 34, as best seen in FIGS. 1 and 2a, extending between the side pieces 20, 21.

The raised central piece 22 is also provided with a plurality of openings 36 to provide access for core ejectors, detailed below, for ejecting the core mould element 16.

For attaching the mould parts 12, 14 together, the side pieces 20, 21 include openings 38, 40 for alignment pins, and an exemplary alignment or leader pin 42 is shown, extending through one of the openings 38 to engage a complementary bushing 43. The openings 38 and 40 are intended for alignment or leader pins inserted from the opposing direction.

As shown, the upper mould part 12 is provided with curved portions 46 to define the lip area, in a spliced joint in a handrail.

The lower mould part 14 corresponds to the upper mould part 12, and includes the top surface 50 corresponding to the bottom surface 26. The lower mould part 14 has a central portion 52 providing a shaped, central channel 55 corresponding to the top surface of a handrail, and side portions 53, 54. Each of the side portions 53, 54 includes a channel 56 intended as an overflow channel for accepting overflow of excess thermoplastic.

As for the upper mould part 12, the side portions 53, 54 each include a central part 58 and end parts 60, separated by thermal breaks 62.

Figure 4:
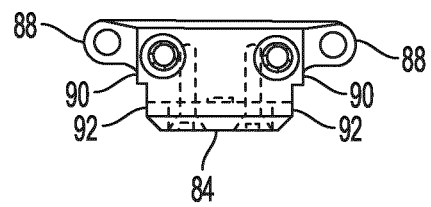
FIG. 4 is an end view of the core mould element.

Corresponding to the openings 38, 40, the lower mould part 14 includes openings 68 and 70 for alignment pins. Openings 72 are provided for bolts for securing the mould parts 12, 14 to a thermal platen Referring primarily to FIGS. 2a, 2b, 3 and 4, the core mould element 16 includes a central part 80 and end parts 81 and 82. These parts 80, 81 and 82 all have a profile corresponding to the T-shaped slot in a handrail. As shown in FIG. 4, each of the parts 80, 81 and 82 has a flat bottom surface 84 rounded, generally semi-circular outer edge surfaces 88. Each of the parts 80, 81 and 82 then has outer vertical surfaces 90 that continue through steps to inner vertical surfaces 92. The inner vertical surfaces 92 correspond to the sides of the rectangular channel 34. The outer vertical surfaces 90, in an assembled condition provide a continuation of surfaces 94 as extensions of the curved portions 46.

As shown, at each end, insulation pieces 100 can be provided between the central part 80 and the end parts 81, 82. To align the central part 80 and the end parts 81, 82, bores and corresponding machine dowels 102 are provided.

Elongate screws 104 extend through bores of the end parts 81, 82 into threaded bores of the central part 80.

At least for assisting in the separation of the core from the top mould half at the end of the cycle, push-off plates 106 can be secured by bolts or screws 108 to ends of the central part 80. The end parts 81, 82 are provided with a cross-sectional profile corresponding to the central part 80 where the push-off plates 106 are attached as shown in FIG. 1, i.e. the end parts 81, 82 are deeper than the central part 80 without the plates 106. The spacing between the push-off plates 106 corresponds to the length of the raised central piece 22 of the upper mould part 12.

Figure 6:
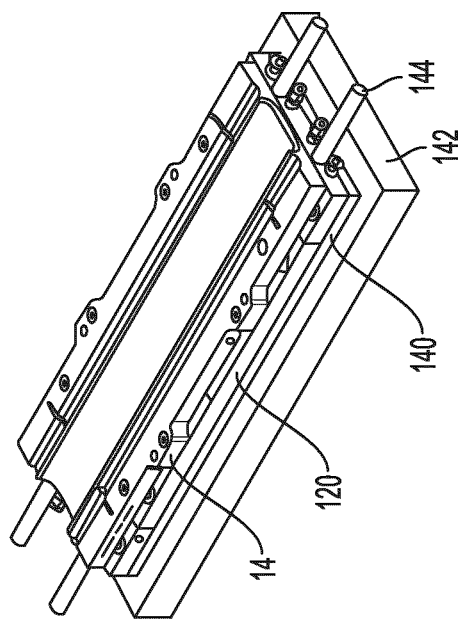
FIG. 6 is a perspective view of the lower thermal platen, the lower insulation pad, the lower press platen, and a lower mould part.
Figure 5:
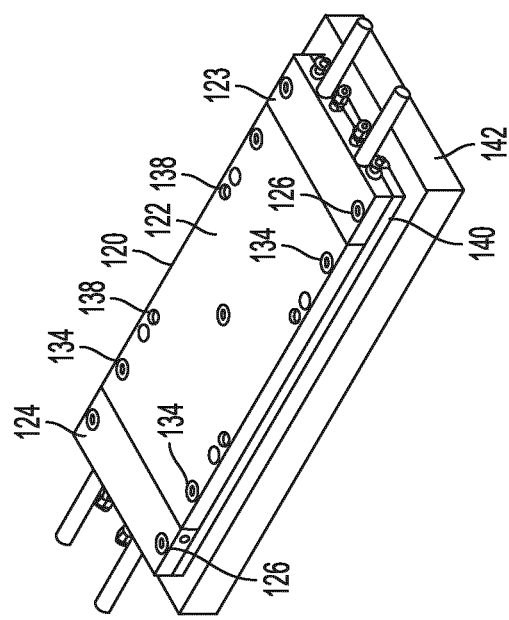
FIG. 5 is a perspective view of a lower thermal platen, a lower insulation pad and a lower press platen.

Referring to FIGS. 5 and 6, a lower thermal platen is shown, indicated at 120. The lower thermal platen 120, including a central portion 122 and end portions 123 and 124, each being a rectangular cuboid.

Figure 9:
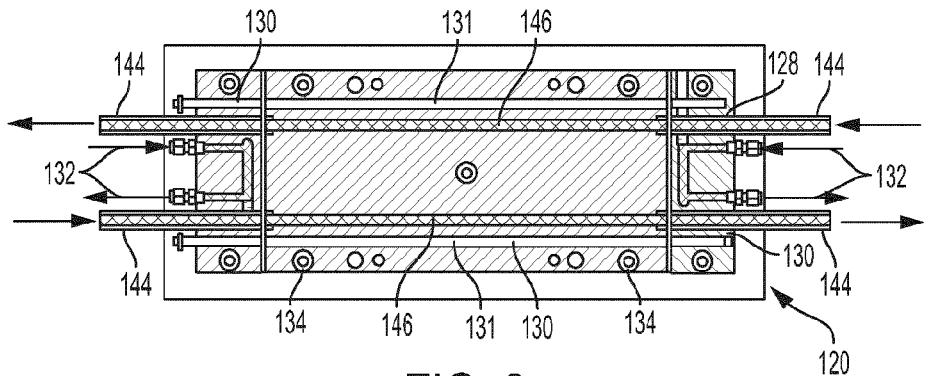
FIG. 9 is a sectional view of the lower thermal platen showing heating and cooling functions, along the line 9-9 of FIG. 10.
Figure 10:
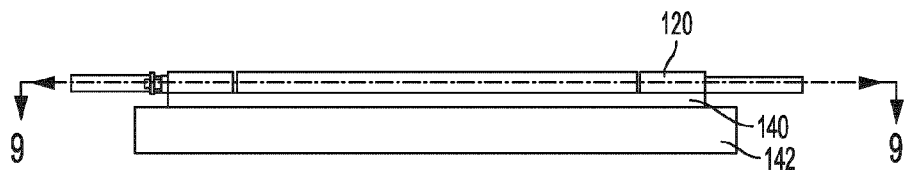
FIG. 10 is a side view of the lower thermal platen, insulation pad and press platen, to show location of the sectional view of FIG. 9.

Each of the end portions 123, 124 includes countersunk openings 126 for securing the respective end portion and a lower insulation pad or bolster 140 on a lower press platen 142. As shown in FIGS. 9 and 10, each end portion 123, 124 includes a pair of bores 128 for pipes for a cooling fluid, and bores 130 for heating elements 131. Each end portion 123, 124 also has a pair of openings 132 for coolant for cooling the respective end portion.

The central portion 122 has countersunk openings 134, for securing it and the insulation pad or bolster 140 to the lower press platen 142, as for the end portions. The central portion 122 also has threaded bores 138, corresponding to openings of the lower mould part 14, for securing the lower mould part 14 in place.

The central portion 122 includes elongate bores 146, 148 extending the length thereof and corresponding to the bores 128 and 130 for pipes for cooling fluid and heating elements respectively. Pipes for cooling fluid are shown schematically at 144.

Figure 7:
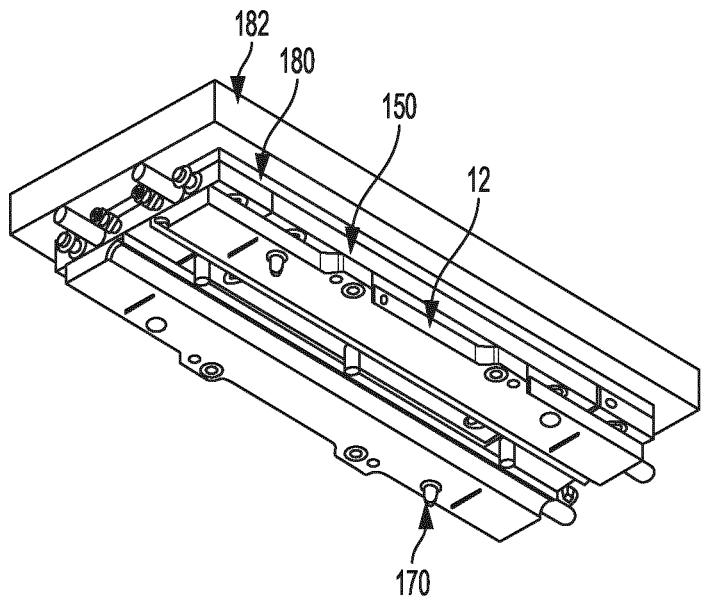
FIG. 7 is a perspective view of an upper thermal, an upper insulation pad, an upper press platen, and an upper mould part; showing core ejectors activated.
Figure 8:
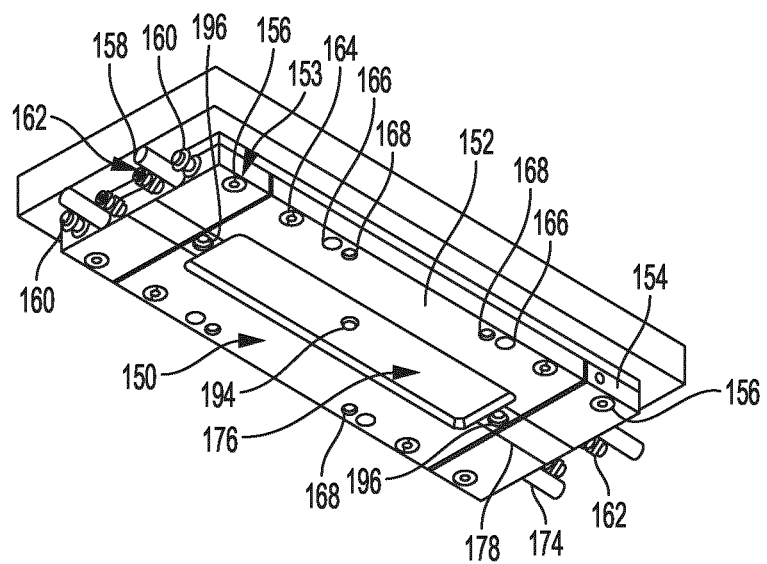
FIG. 8 is a perspective view of the upper thermal platen, the upper insulation pad, and the upper press platen.

An assembly of an upper thermal platen 150, an upper insulation pad or bolster 180 and the upper mould part 12 is shown in FIG. 7 and the overall arrangement corresponds to the lower press platen 142, lower insulation pad 140, lower thermal platen 120 and lower mould part 14, with FIG. 8 showing a similar view without the upper mould part 12.

The upper thermal platen 150 includes a central portion 152 and end portions 153 and 154.

Each end portion 153, 154 is provided with countersunk openings 156. The end portions 153, 154 have bores 158 for pipes for cooling fluid and bores 160 for heating elements. Further openings 162 are provided for cooling fluid for the end portions 153, 154.

The central portion 152 has countersunk openings 164, openings 166 for alignment, and threaded bores 168 for connecting bolts. Elongate bores (not shown) are provided for cooling pipes and heating elements respectively. Again, an exemplary cooling pipe is shown at 174.

Four alignment pins 170, with two shown in FIG. 7, are provided, to ensure alignment of the upper and lower mould parts 12 and 14.

Unlike the lower thermal platen 120, the upper thermal platen 150 is provided with a central recess 176, in the central portion 152, corresponding to the raised central piece 22 of the upper mould part 12. This may be spaced from the raised central piece 22 of the upper mould part 12. Additionally, shallow rectangular grooves 178 are provided extending from a central recess through into the end portions 153, 154, corresponding to the top surface of the end parts 81, 82 of the core.

In use, the raised central piece 22 of the upper mould part 12 prevents the flat bottom surface 84 of the core mould element 16 from coming into direct contact with upper thermal platen 150. The raised central piece 22 allows the top mould surface to contact the upper thermal platen 150 but not the core element 16. The idea is to minimize the thermal mass of the mould and create thermal isolation of the core element 16, so as to heat and cool as quickly as possible. It may be advantageous to cool the splice predominately from the outside surface. This creates a stress gradient in the thermoplastic as the spliced joint cools, so that the profile of the handrail, at the splice, does not tend to open up after the mould opens. Put another way, this increases the lip strength of the handrail, and may correspond with cooling applied to the handrail during manufacture that has the same effect.

Figure 11:
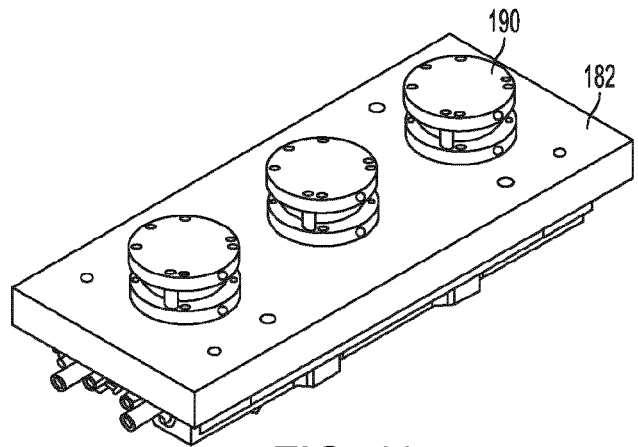
FIG. 11 is a perspective view of the upper thermal platen, the upper insulation pad, and the upper press platen, showing core ejectors.
Figure 12:
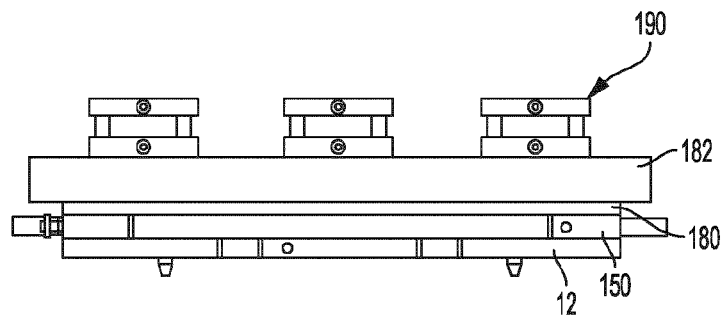
FIG. 12 is a side view of the upper thermal platen, the upper insulation pad, and the upper press platen of FIG. 11.
Figure 13A:
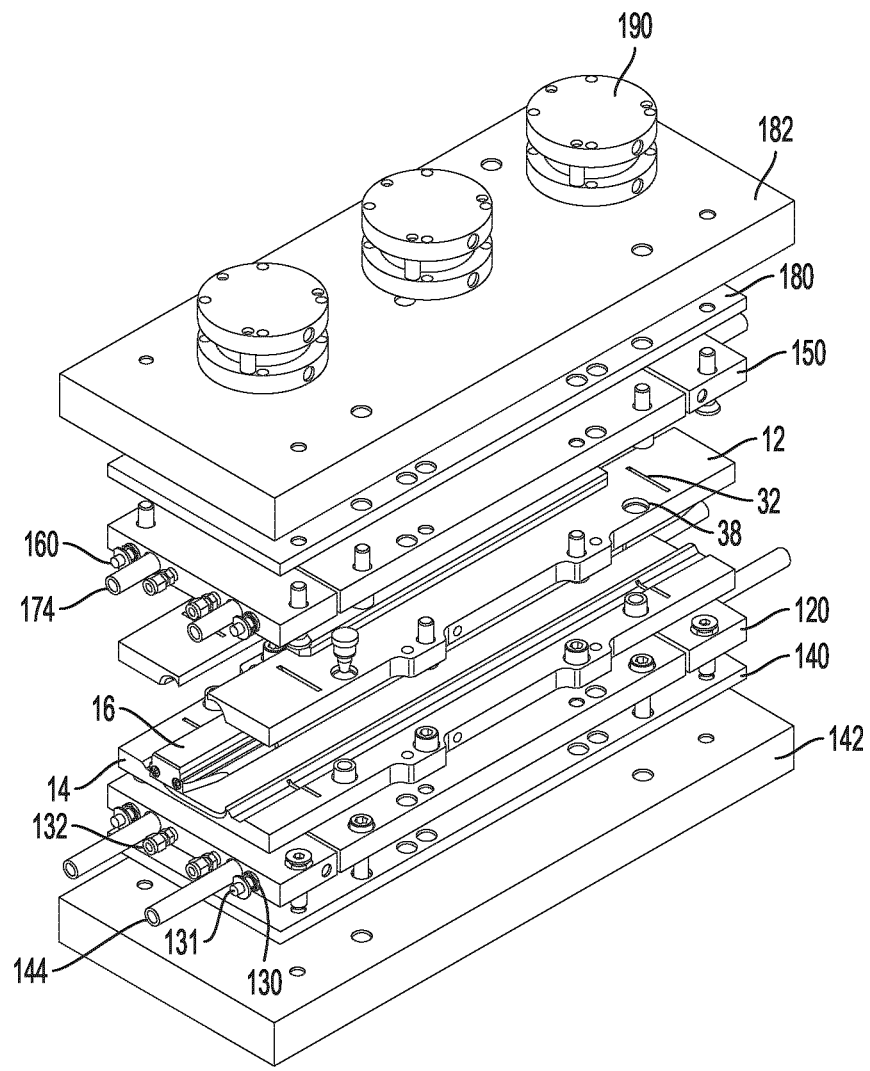
FIG. 13a is a perspective view of the core ejectors, upper press platen, upper insulation pad, upper thermal platen, upper mould part, core mould element, lower mould part, lower thermal platen, lower insulation pad, and lower press platen of the mould assembly, shown in an exploded configuration.
Figure 13B:
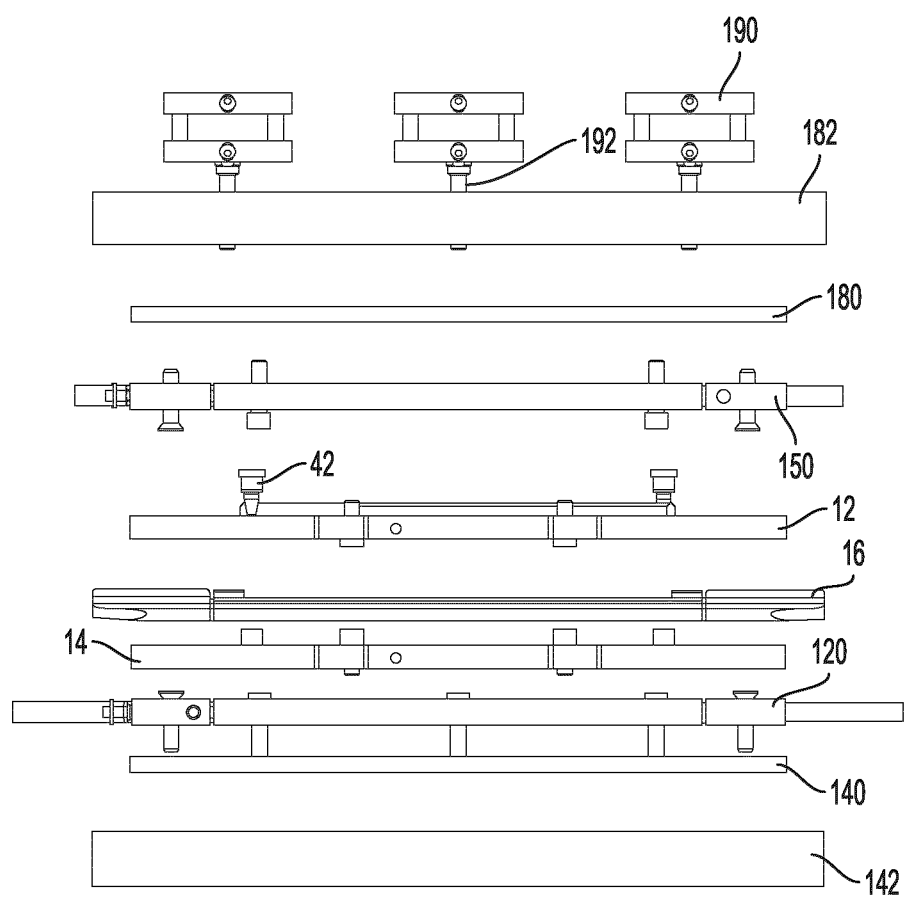
FIG. 13b is a side view of the core ejectors, upper press platen, upper insulation pad, upper thermal platen, upper mould part, core mould element, lower mould part, lower thermal platen, lower insulation pad, and lower press platen of the mould assembly, shown in an exploded configuration.

Three pneumatic actuators 190 are provided, as shown in FIGS. 11 and 12, mounted on to the outside of the upper press platen 182, and each provided with an ejector pin 192 extending to and through the upper mould part 12, as shown in FIGS. 7 and 13b. As shown in FIG. 8, openings 194 and 196 for the pneumatic actuators are provided at the center and ends respectively of the central portion 152 of the upper thermal platen 150. The central opening 194 is aligned with the opening 36 in the upper mould part 12.

The ejector pins 192 are used to push the core element 16 down at the end of the cycle as the mould opens. The pins 192 are also used during the heat cycle to push down the edges of the core element 16, which may provide a better transition between moulded and unmoulded sections of the product.

FIGS. 13a and 13b, in perspective and side view, respectively, show the exploded configuration of the mould assembly.

Figure 14A:
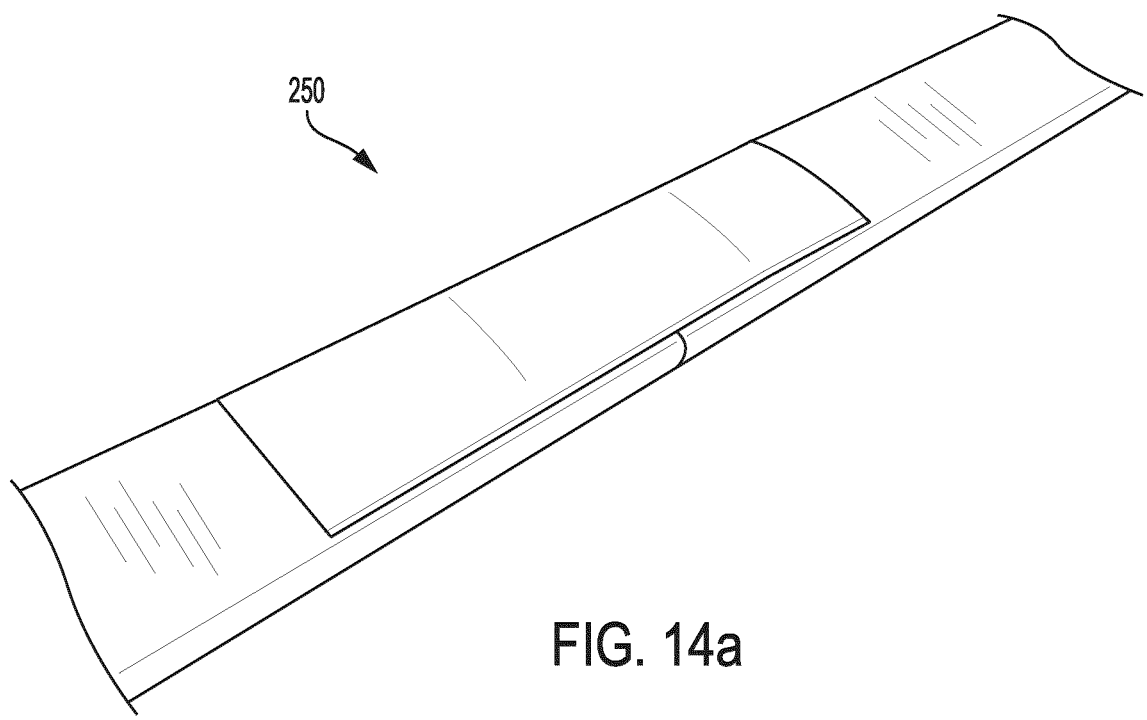
FIGS. 14a and 14b are schematic views of a spliced handrail joint.
Figure 14B:
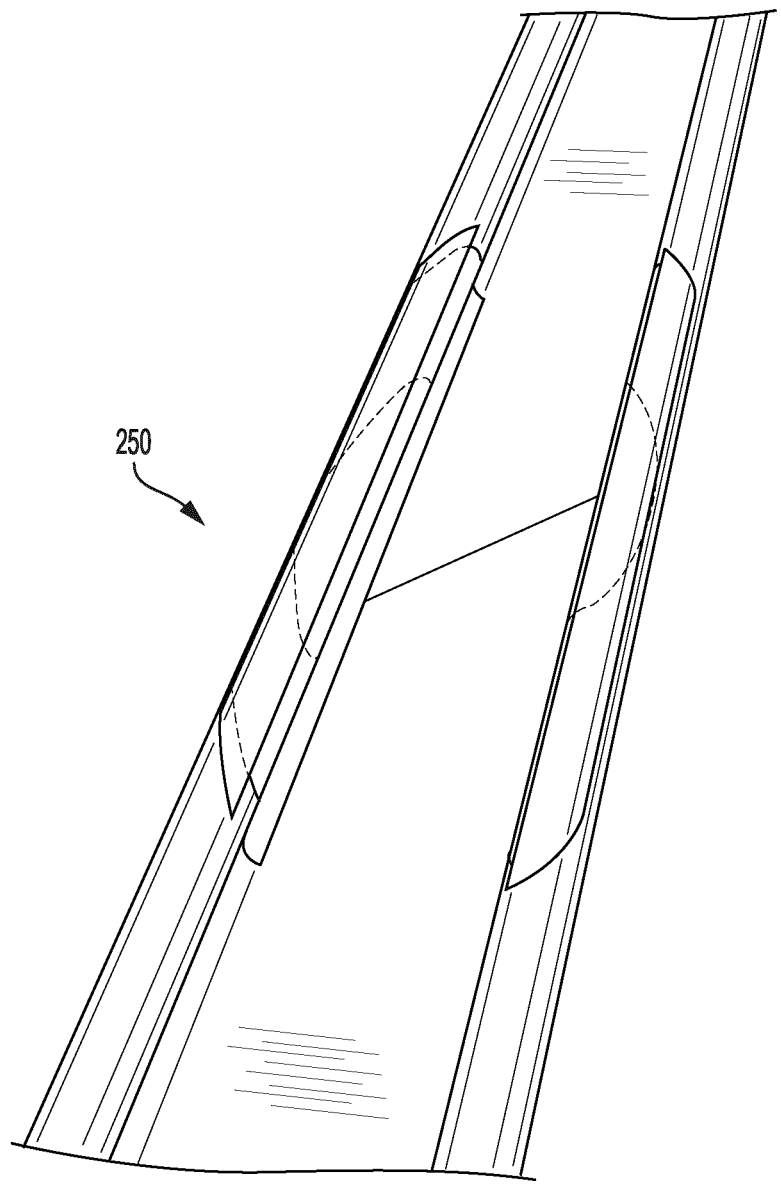

In use, a spliced handrail joint, indicated schematically at 250 in FIGS. 14a and 14b, is assembled with the core element 16 located within the T-shaped slot of the handrail. The handrail spliced joint, in an inverted position as shown, is then placed on the lower mould part 14, which is already in position, located and secured to the lower thermal platen 120. The upper mould part 12 is then placed on top of the lower mould part 14, and the upper thermal platen 150 placed on top of the upper mould part 12. The two platens 120, 150 and the mould parts 12, 14 are then secured together.

Bolts 184 and 186 are used to secure the central and end portions of the lower thermal platen 120 together with the insulated pad 140 to the lower press platen 142. Further bolts 188 are used to secure the lower mould part 14 to the lower thermal platen 120. A corresponding arrangement of bolts is provided for the upper elements of the assembly and bolts 189 are shown for securing the upper mould part 12 in position.

Figure 15:
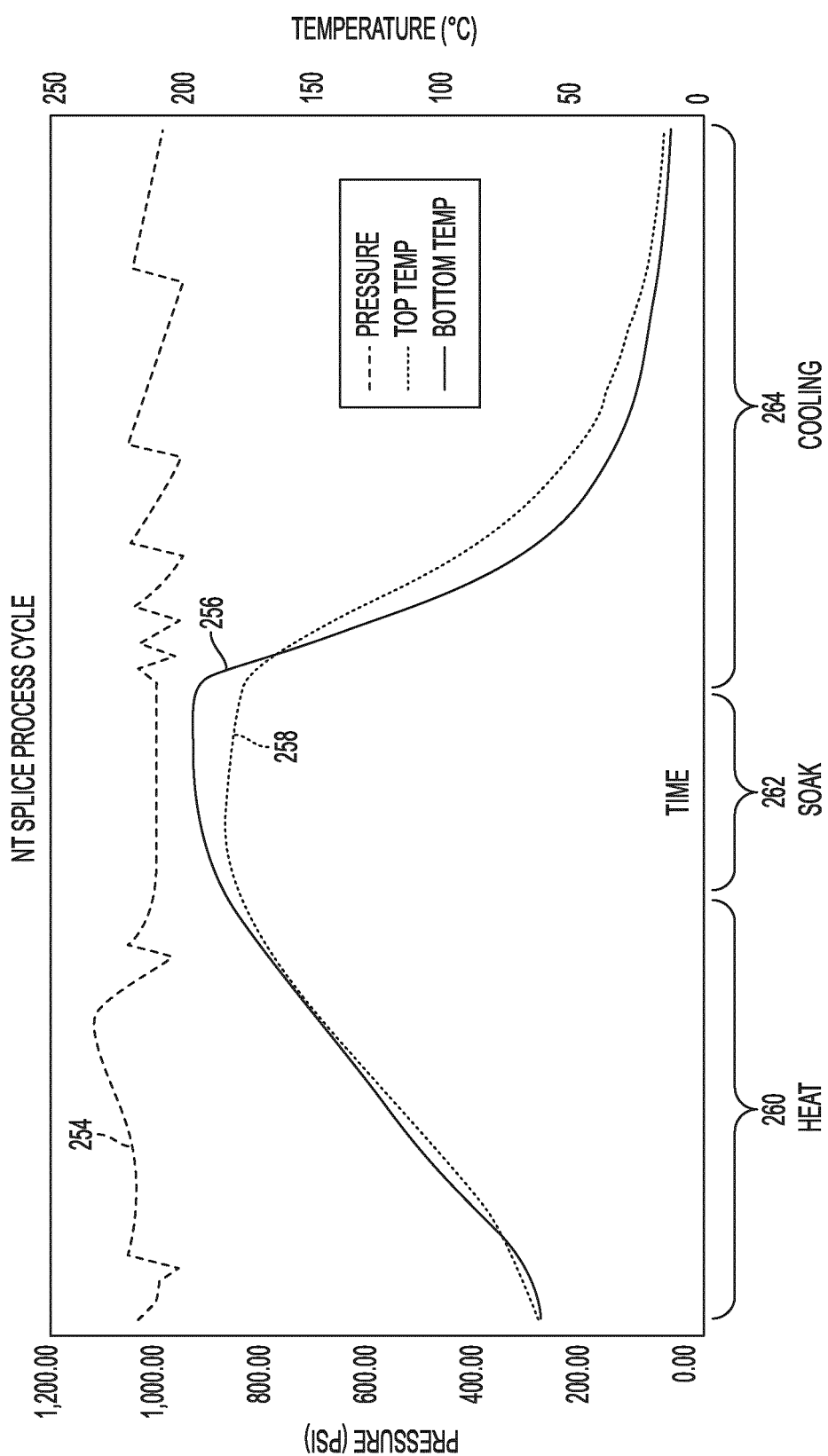
FIG. 15 is a graph showing variation of temperature and pressure during operation of the mould.

A press is then used to apply pressure to the platens 120, 150 and the mould parts 12, 14. Reference will now be made to FIG. 15, which shows a splicing process cycle. The assembled spliced joint, but unmoulded, may be prepared, for example, as disclosed in U.S. Provisional Application No. 62/591,954 filed on Nov. 29, 2017 and the corresponding International Application entitled METHOD OF FORMING A SPLICED JOINT IN A HANDRAIL OR OTHER ELONGATE ARTICLE, the entire contents of each are herein incorporated by reference.

The completed spliced joint is assembled, and the core element 16 is fitted into spliced joint, as required, by flexing the lips of the joint to enabling insertion of the core element 16. The core element 16 is mounted in a floating position, in the sense that it is not secured to other elements of the mould. The splice joint with the core element 16 is in placed between the upper and lower mould parts 12, 14, which are already mounted to the press platens 142, 182 as shown.

Pressure is then applied to the press platens 142, 182; as shown in FIG. 15, the pressure generates, for example, a pressure of at least 1000 psig, as indicated at 254 in FIG. 15. The heating elements in the upper and lower mould parts 12, 14 are then actuated, to heat the mould and the spliced joint. As shown by the plots 256, 258, the temperatures of the upper and lower mould parts 12, 14 follow similar profiles, increasing from an initial temperature above 50° C. to a temperature in excess of 170° C. The mould may be pre-heated to between approximately 40 to 50° C. between cycles to reduce cycle time and eliminate condensation from the previous cycle, which can take the mould to between approximately 10 and 15° C.

As indicated on FIG. 15, the heating phase of the cycle is indicated at 260 with the pressure maintained as indicated at 254; when the desired temperature is reached, the temperature is maintained above that required for moulding during a soak phase 262, as shown, for a time period of at least 30 seconds, whereby the various thermoplastic components melt and bond together, to form a completed spliced joint, and cooling the assembled spliced joint before removal from the mould. At the end of the soak phase, the heating elements are turned off, and cooling can commence in a cooling phase 264.

As shown, during the heating, soaking and cooling phases 260, 262, 264, the pressure 254 is maintained above a required minimum value. The mould closes with 1000 psig hydraulic pressure and the pressure increases during heating as the moulded part expands. As the part melts the pressure drops, which causes the hydraulic system to turn on to increase the pressure back to the setpoint. Once the mould is closed pressure stabilizes. When the cooling starts all components contract, causing the pressure to reduce, and the hydraulic system again is actuated, as needed, to maintain pressure.

An alternative embodiment does not have the hydraulic system running during the process. In this case, the mould is closed with approximately 1000 psig and the hydraulic pump is shut off. The movement is then controlled with a set of large springs, which are preloaded when the mould closes. In this case the pressure rises to approximately 1200 psi during heating and drops to 800 psi at the end of the cooling cycle.

Cooling is achieved by passing cooling fluid through the cooling channels as detailed above.

As detailed above, during the moulding operation, pressure can be applied using the pneumatic actuators 190, to the floating core element 16, which may provide improved characteristics to a moulded joint. During the cooling phase 264, cooling fluid is supplied through the cooling ducts, as detailed above. At the end of the cooling phase 264, the pressure can be removed from the press platens 142 and 182, and the mould is opened. During opening the mould, the pneumatic actuators 190 are further used to displace the core element 16 away from the upper mould part 12, the spliced joint is removed from the lower part mould 14 and the core element 16 can be extracted from the handrail.

A finished joint is then inspected for any flaws or defects. Minor excess amounts of thermoplastic that may have been extruded out during the moulding process can be trimmed as required.

While the above description provides examples of one or more apparatuses or methods, it will be appreciated that other apparatuses or methods may be within the scope of the accompanying claims.

We claim:

1. A mould assembly for moulding a joint in an elongate article, the mould assembly comprising:
   a first mould part;
   a second mould part;
   a core mould element for mounting between the first and second mould parts;
   a first thermal platen; and
   a second thermal platen,
   wherein the first and second mould parts and the core mould element are mounted between the first and second thermal platens,
   wherein each of the first and second mould parts is provided with thermal breaks, between central and end parts thereof,
   wherein the first mould part is an upper mould part and comprises two side pieces and a raised central piece, wherein each of the side pieces comprises a central part and two end parts with thermal breaks between the central and end parts thereof, and wherein the raised central piece extends above the side pieces connecting the central parts of the side pieces,
   wherein an elongate rectangular channel is defined between the side pieces and extending into the raised central piece of the first mould part,
   wherein the elongate article is a handrail, and the core mould element comprises a central part and end parts, each having a cross-section corresponding to an internal T-shaped slot of the handrail, and
   wherein the central part of the core mould element comprises raised pieces on either side of a middle section, the middle section fitting into the elongate rectangular channel of the raised central piece of the first mould part.

2. The mould assembly of claim 1, wherein the second thermal platen has a generally planar bottom face and the first thermal platen has a generally planar top face, for mounting in a press, for maintaining a desired pressure within the mould assembly.

3. The mould assembly of claim 1, wherein the first and the second thermal platens provide for heating and cooling the mould assembly.

4. The mould assembly of claim 3, wherein each of the first thermal platen and the second thermal platens comprises a central portion and end portions, with thermal breaks between the central portion and the end portions.

5. The mould assembly of claim 4, wherein, for each of the first and the second thermal platens, bores extend through the central and end portions, for receiving heating elements and pipes for cooling fluid.

6. The mould assembly of claim 5, wherein, for each of the first and second thermal platens, the end portions thereof are provided with bores for a cooling fluid for cooling the end portions.

7. The mould assembly of claim 1, comprising insulation pieces between the central and end parts of the core mould element.

8. The mould assembly of claim 1, wherein the raised pieces comprise separate plates attached to the central part of the core mould element, to provide a push-off function, and wherein the end parts of the core mould element are level with the raised pieces.

9. The mould assembly of claim 1, wherein the second mould part comprises thermal breaks, and a central channel defining a top surface of the elongate article, and overflow channels on either side of the central channel, for overflow of thermoplastic material.

10. The mould assembly of claim 1, comprising bores for alignment pins between the first and second mould parts and the second and first thermal platens.

11. The mould assembly of claim 1, wherein the first thermal platen is an upper thermal platen and is provided with a planar lower surface, comprising a central recess for accommodating the raised central piece of the first mould part, and shallow rectangular channels extending from the central recess, from the central part through the end parts, to accommodate the core mould element.

12. The mould assembly of claim 1, comprising first and second press platens and insulated pads between the first thermal and press platens and between the second thermal and press platens.

13. The mould assembly of claim 1, wherein the core element is floating and unattached to the first and second mould parts.

14. The mould assembly of claim 13, comprising actuators for applying pressure to the core element.

15. The mould assembly of claim 1, comprising:
a first press platen;
a first insulated pad;
a second insulated pad; and
a second press platen,
wherein the first and second thermal platens are configured for heating and cooling the mould parts, and
wherein the first press platen, the first insulated pad, the first thermal platen, and the first mould part are secured together, and the second mould part, the second thermal platen, the second insulated pad and the second press platen are secured together.

16. The mould assembly of claim 15, wherein at least a central part of the core mould element is maintained spaced from the first mould part, to reduce heat transfer therebetween.

17. A mould assembly for moulding a joint in an elongate article, the mould assembly comprising:
a first mould part;
a second mould part;
a core mould element for mounting between the first and second mould parts;
a first thermal platen; and
a second thermal platen,
wherein the first and second mould parts and the core mould element are mounted between the first and second thermal platens, and
wherein the first thermal platen is an upper thermal platen and is provided with a planar lower surface, comprising a central recess for accommodating a raised central piece of the first mould part, and shallow rectangular channels extending from the central recess, from a central part through end parts, to accommodate the core mould element.

18. The mould assembly of claim 17, wherein the second thermal platen has a generally planar bottom face and the first thermal platen has a generally planar top face, for mounting in a press, for maintaining a desired pressure within the mould assembly.

19. The mould assembly of claim 17, wherein the first and the second thermal platens provide for heating and cooling the mould assembly.

20. The mould assembly of claim 19, wherein each of the first thermal platen and the second thermal platens comprises a central portion and end portions, with thermal breaks between the central portion and the end portions.

21. The mould assembly of claim 20, wherein, for each of the first and the second thermal platens, bores extend through the central and end portions, for receiving heating elements and pipes for cooling fluid.

22. The mould assembly of claim 21, wherein, for each of the first and second thermal platens, the end portions thereof are provided with bores for a cooling fluid for cooling the end portions.

23. The mould assembly of claim 17, wherein the second mould part comprises thermal breaks, and a central channel defining a top surface of the elongate article, and overflow channels on either side of the central channel, for overflow of thermoplastic material.

24. The mould assembly of claim 17, comprising bores for alignment pins between the first and second mould parts and the second and first thermal platens.

25. The mould assembly of claim 17, comprising first and second press platens and insulated pads between the first thermal and press platens and between the second thermal and press platens.

26. The mould assembly of claim 17, wherein the core element is floating and unattached to the first and second mould parts.

27. The mould assembly of claim 26, comprising actuators for applying pressure to the core element.

* * * * *